(12) United States Patent
Sawano et al.

(10) Patent No.: US 11,904,451 B2
(45) Date of Patent: Feb. 20, 2024

(54) ELECTRIC POWER TOOL

(71) Applicant: Panasonic Intellectual Property Management Co., Ltd., Osaka (JP)

(72) Inventors: Fumiaki Sawano, Mie (JP); Masaaki Okada, Mie (JP); Hidekazu Yuasa, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 500 days.

(21) Appl. No.: 16/685,976

(22) Filed: Nov. 15, 2019

(65) Prior Publication Data

US 2020/0078921 A1 Mar. 12, 2020

Related U.S. Application Data

(63) Continuation of application No. 15/214,995, filed on Jul. 20, 2016, now Pat. No. 10,661,424.

(30) Foreign Application Priority Data

Aug. 4, 2015 (JP) .................................. 2015-154073

(51) Int. Cl.
  *B25F 5/00* (2006.01)
  *B25B 21/00* (2006.01)
  *B23B 45/00* (2006.01)

(52) U.S. Cl.
  CPC ............ *B25F 5/001* (2013.01); *B23B 45/008* (2013.01); *B25B 21/00* (2013.01); *B25F 5/00* (2013.01)

(58) Field of Classification Search
  None
  See application file for complete search history.

(56) References Cited

U.S. PATENT DOCUMENTS

| 4,410,846 A | 10/1983 | Gerber et al. |
| 4,540,318 A | 9/1985 | Hornung et al. |
| (Continued) | | |

FOREIGN PATENT DOCUMENTS

| EP | 1510299 A2 | 3/2005 |
| EP | 2329922 A2 | 6/2011 |
| (Continued) | | |

OTHER PUBLICATIONS

Notice of Allowance received in related U.S. Appl. No. 16/702,310 dated Sep. 29, 2021.

(Continued)

*Primary Examiner* — Tanzim Imam
(74) *Attorney, Agent, or Firm* — Rimon P.C.

(57) ABSTRACT

An electric power tool includes a motor, an output shaft, a drive force transmission configured to reduce drive speed of the motor and transmit drive force of the motor to the output shaft; a trigger that can be pulled by a user; a rotation speed changing circuitry configured to change a rotation speed of the output shaft that corresponds to a maximum pulled amount of the trigger to a limited rotation speed that is lower than a maximum rotation speed of the output shaft in a non-limited rotation speed mode; and a rotation speed control circuitry configured to control a rotation speed of the motor in correspondence with a pulled amount of the trigger to obtain the rotation speed of the output shaft that is changed by the rotation speed changing circuitry.

2 Claims, 3 Drawing Sheets

(56) References Cited

U.S. PATENT DOCUMENTS

| | | | | |
|---|---|---|---|---|
| 7,086,483 | B2* | 8/2006 | Arimura | B25B 21/00 |
| | | | | 173/180 |
| 8,689,900 | B2* | 4/2014 | Miwa | B25F 5/001 |
| | | | | 173/217 |
| 2003/0089511 | A1* | 5/2003 | Tsuneda | B25B 21/00 |
| | | | | 173/217 |
| 2007/0201748 | A1 | 8/2007 | Bixler et al. | |
| 2009/0295313 | A1* | 12/2009 | Suzuki | H02H 7/0838 |
| | | | | 318/400.18 |
| 2013/0082631 | A1* | 4/2013 | Suzuki | H02H 7/093 |
| | | | | 318/461 |
| 2013/0186666 | A1* | 7/2013 | Yoshino | B25B 23/14 |
| | | | | 173/176 |
| 2016/0301340 | A1* | 10/2016 | Najjar | B25F 5/001 |
| 2016/0311094 | A1* | 10/2016 | Mergener | H02J 7/0024 |

FOREIGN PATENT DOCUMENTS

| | | | | |
|---|---|---|---|---|
| EP | 2572832 | A1 | | 3/2013 |
| EP | 2708329 | A1 | | 3/2014 |
| GB | 2217480 | A | | 10/1989 |
| JP | 61-201708 | U | | 12/1986 |
| JP | H01-306110 | A | | 12/1989 |
| JP | 2003-145447 | A | | 5/2003 |
| JP | 2009-012153 | A | | 1/2009 |
| JP | 2009-285805 | A | | 12/2009 |
| JP | 2012139800 | A | * | 7/2012 ............ B25B 21/00 |
| JP | 2013-022665 | A | | 2/2013 |
| JP | 2014-111311 | A | | 6/2014 |
| JP | 2015-091626 | A | | 5/2015 |
| WO | 2015/025677 | A1 | | 2/2015 |
| WO | WO-2015061370 | A1 | * | 4/2015 ............ B23B 45/008 |

OTHER PUBLICATIONS

Non-Final Office Action issued in U.S. Appl. No. 15/214,995, dated Aug. 31, 2018.
Final Office Action issued in U.S. Appl. No. 15/214,995, dated Mar. 6, 2019.
Non-Final Office Action issued in U.S. Appl. No. 15/214,995, dated Jul. 25, 2019.
Japanese Office Action issued in Application No. 2015-154073, dated Feb. 5, 2019.
Extended European Search Report issued in Application No. 16179043.1 dated Jan. 31, 2017.
"Milwaukee M18 Fuel Impact Driver 2653-22 Preview" from Protool Reviews, post from May 14, 2012 https://www.protoolreviews.com/tools/milwaukee-m18-fuel-impact-2653-22/1704/.
"Milwaukee Fuel M18 Brushless Impact Driver" from TOOLGUYD, post from Mar. 12, 2012 https://toolguyd.com/milwaukee-fuel-m18-brushless-impact-driver/.

* cited by examiner

ELECTRIC POWER TOOL

CROSS-REFERENCE TO RELATED APPLICATIONS

This application a continuation of U.S. patent application Ser. No. 15/214,995, filed Jul. 20, 2016, now U.S. Pat. No. 10,661,424, which is based upon and claims the benefit of priority from prior Japanese Patent Application No. 2015-154073, filed on Aug. 4, 2015, the entire contents of which are incorporated herein by reference.

FIELD

The present invention relates to an electric power tool provided with a drilling function.

BACKGROUND ART

Japanese Laid-Open Patent Publication No. 2009-12153 describes an example of an electric power tool provided with a drilling function such as a drill driver. Such an electric power tool is used with a bit, such as a drill or a hole saw, to bore a hole in a plate of wood, steel, or the like.

A user manipulates a trigger of an electric power tool provided with a drilling function so that the rotation speed of a motor changes in correspondence with the pulled amount (manipulation amount) of the trigger. As the pulled amount of the trigger increases, the rotation speed of the motor, or the bit, increases.

SUMMARY

The rotation speed range differs between bits. For example, when a hole saw is attached to the electric power tool to bore a hole in a steel plate, excessive pulling of the trigger excessively increases the rotation speed of the bit and causes excessive wear of the bit.

It is an object of the present invention to provide an electric power tool that prolongs the service life of a bit.

One aspect of the present invention provides an electric power tool including a motor, an output shaft, a drive force transmission, a trigger, a rotation speed changing circuitry, and a rotation speed control circuitry. The drive force transmission is configured to reduce drive speed of the motor and transmit drive force of the motor to the output shaft. The trigger can be pulled by a user. The rotation speed changing circuitry is configured to change a rotation speed of the output shaft that corresponds to a maximum pulled amount of the trigger to a limited rotation speed that is lower than a maximum rotation speed of the output shaft in a non-limited rotation speed mode. The rotation speed control circuitry configured to control a rotation speed of the motor in correspondence with a pulled amount of the trigger to obtain the rotation speed of the output shaft that is changed by the rotation speed changing circuitry.

The electric power tool according to the above aspect of the present invention prolongs the service life of the bit. Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of an electric power tool will now be described with reference to the drawings.

Figure 1:
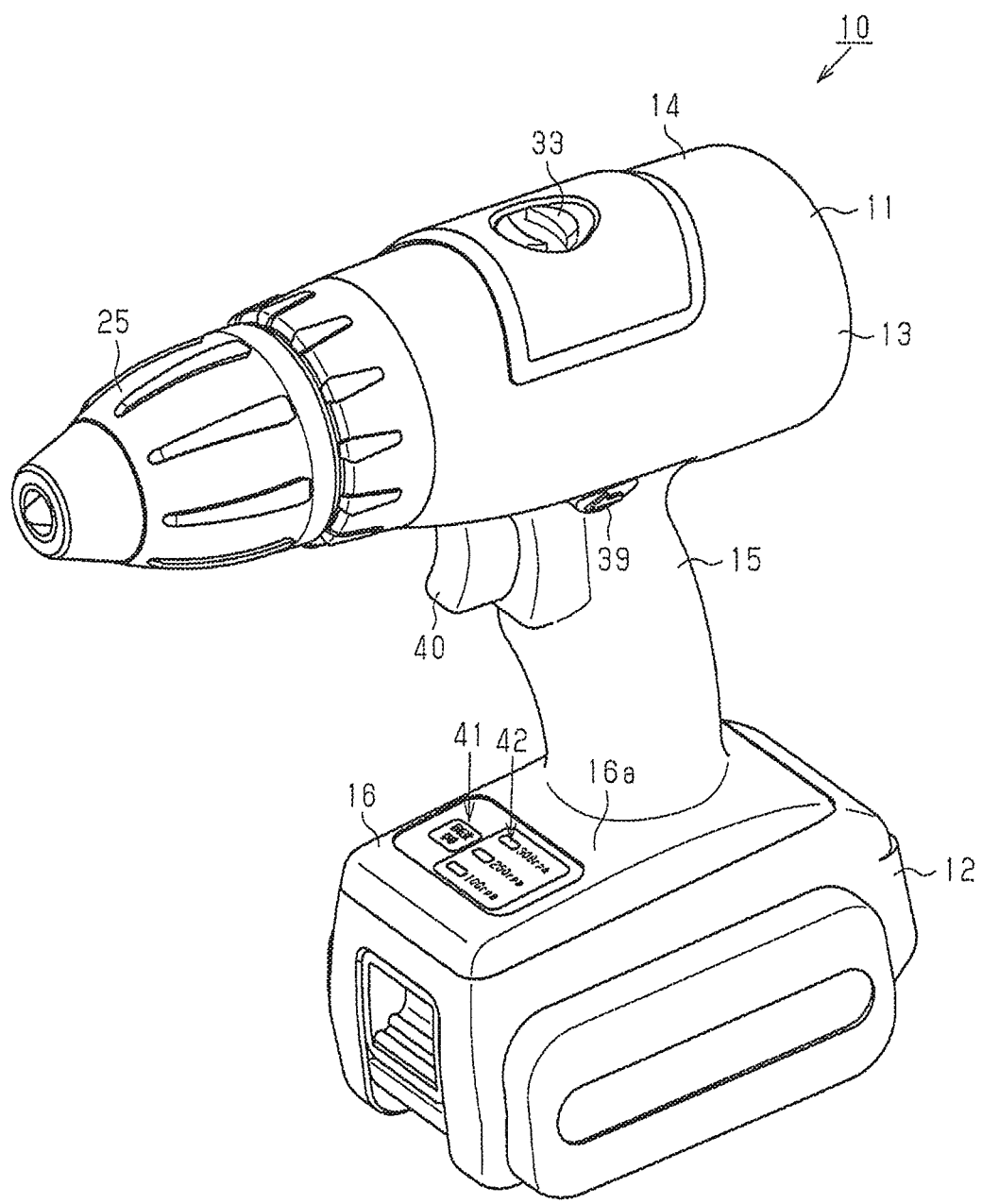
FIG. 1 is a perspective view of an electric power tool.

As shown in FIG. 1, an electric power tool 10 of the present embodiment includes a main body 11 and a battery pack 12, which is attached in a removable manner to the main body 11. For example, the battery pack 12 may incorporate a rechargeable battery that is configured by battery cells.

The main body 11 of the electric power tool 10 may be, for example, a drill driver provided with a drilling function. The main body 11 includes a main body case 13 and a motor 21 (refer to FIG. 2), which is accommodated in the main body case 13. The main body case 13 includes a cylindrical body portion 14 and a hand grip 15, which extends downward from the body portion 14. In the description hereafter, the longitudinal direction of the body portion 14 is referred to as the front-rear direction. The general direction in which the hand grip 15 extends is orthogonal to the front-rear direction and referred to as the vertical direction. A direction orthogonal to the front-rear direction and the vertical direction may be referred to as the lateral direction.

Figure 2:
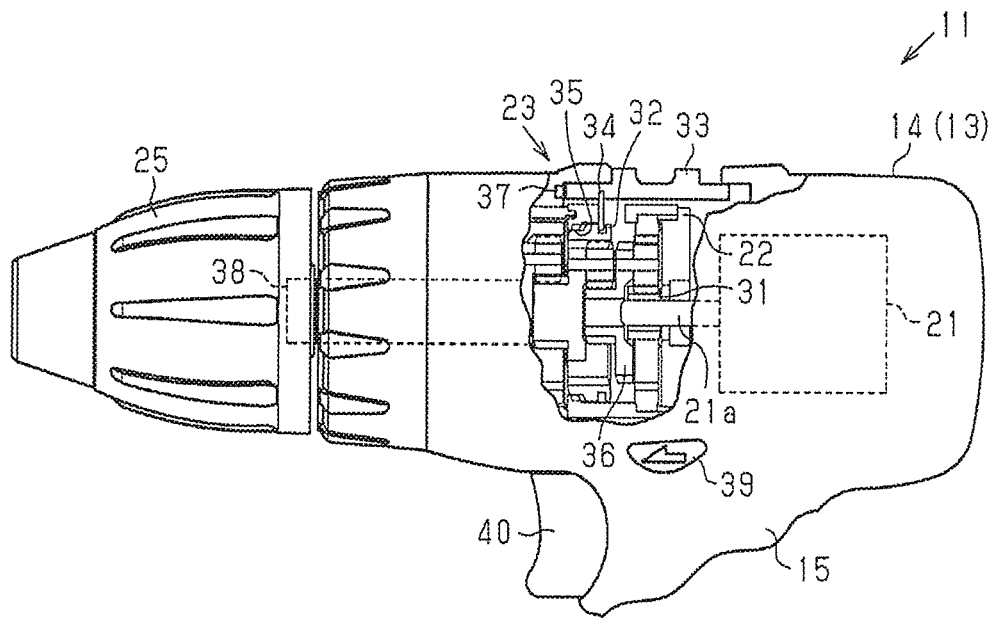
FIG. 2 is a partially cut-away side view of the electric power tool illustrating a speed reduction mechanism when a low gear is selected.

As shown in FIG. 2, the motor 2 is accommodated in the main body case 13 at the rear of the body portion 14. Further, the body portion 14 accommodates a drive force transmission 23, which includes a speed reduction mechanism 22 and a clutch mechanism (not shown), in front of the motor 21. A chuck 25 is arranged on the front end of the main body 11. A bit such as a hole saw is fixed in a removable manner to the chuck 25. The output of the drive force transmission 23 is transmitted to the chuck 25.

The speed reduction mechanism 22 is, for example, a three-stage planetary gear mechanism. The gear train of each stage includes a sun gear, planetary gears that mesh with the sun gear, and a ring gear that meshes with the planetary gears.

The motor 21 includes a rotation shaft 21a. A sun gear 31 in the gear train of the first stage is arranged on and rotated integrally with the rotation shaft 21a. A ring gear 32 in the gear train of the second stage is arranged in the body case 13 so as to be linearly movable in the axial direction (front-rear direction) within a predetermined movable length range. A reduction ratio selector 33 is arranged in an upper surface of the main body case 13 to switch the transmission reduction ratio of the speed reduction mechanism 22. The reduction ratio selector 33 may be a mechanical switch such as a slide switch. In the illustrated example, the reduction ratio selector 33 is manually manipulated by a user and moved toward the front or the rear. In accordance with the position of the reduction ratio selector 33, the speed reduction mechanism 22 is switched between a high-speed, low-torque mode (high gear) and a low-speed, high-torque mode (low gear). A connecting member 34 connects the reduction ratio selector 33 to a groove in the outer circumferential surface of the ring gear 32 in the second stage.

Referring to FIG. 2, when the user manipulates the reduction ratio selector 33 and moves the ring gear 32 toward the front (away from the motor 21), the ring gear 32 engages a stopper 35 that is located in the main body case 13. This disables rotation of the ring gear 32. Thus, the gear train of the second stage functions as a speed reduction mechanism that transmits the rotational drive force of the motor 21, which is reduced in speed by the gear trains of every one of the first to third stages, to an output shaft 38. Consequently, the main body 11 is driven in the low-speed, high-torque mode (low gear mode) in which the gear train of the second stage realizes the speed reduction function.

Figure 3:
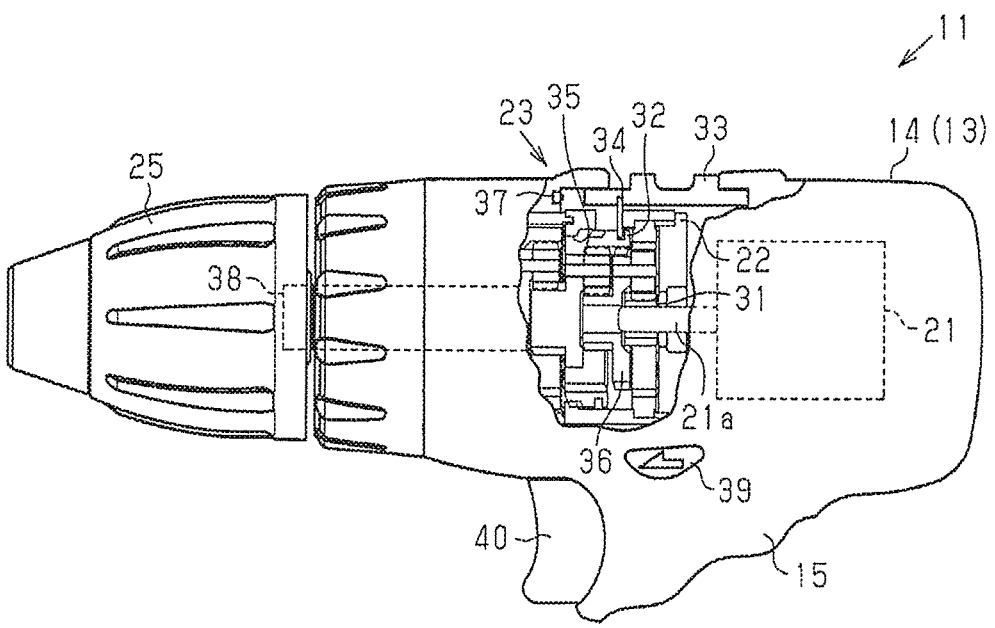
FIG. 3 is a partially cut-away side view of the electric power tool illustrating the speed reduction mechanism when a high gear is selected.

Referring to FIG. 3, when the ring gear 32 is moved toward the rear (toward the motor 21), the ring gear 32 is disengaged from the stopper 35. This enables rotation of the ring gear 32, which meshes with a transmission gear 36 of the first stage. Thus, the entire gear train of the second state including the ring gear 32 rotates integrally. In this case, the gear train of the second stage does not realize the speed reduction function (reduction ratio 1). The rotational drive force of the motor 21 is reduced in speed by only the gear trains of the first and third stages and transmitted to the output shaft 38. Consequently, the main body 11 is driven in the high-speed, low-torque mode (high gear mode) in which the gear train of the second stage does not realize the speed reduction function.

As shown in FIGS. 2 and 3, the main body case 13 includes a manipulation position detection switch 37, which outputs a position signal that is in accordance with the manipulated position of the reduction ratio selector 33. For example, the manipulation position detection switch 37 outputs an ON signal when the reduction ratio selector 33 is manipulated to the low gear (low-speed, high-torque mode) and outputs an OFF signal when the reduction ratio selector 33 is manipulated to the high gear (high-speed, low-torque mode). The position signal of the manipulation position detection switch 37 may be referred to as the reduction ratio signal.

Referring to FIG. 2, the gear train in the third stage of the speed reduction mechanism 22 is connected to the output shaft 38. The output shaft 38 is rotationally supported by a bearing (not shown) arranged in the main body case 13 and configured to transmit drive force to the bit (e.g., hole saw) attached to the chuck 25. For example, the clutch mechanism is located between the speed reduction mechanism 22 (gear train of third stage) and the output shaft 38. The clutch mechanism connects and disconnects the speed reduction mechanism 22 and the output shaft 38 in accordance with the load torque input through the output shaft 38.

As shown in FIGS. 1 and 2, a rotation direction selector 39 is arranged near the portion where the body portion 14 and the hand grip 15 are connected to switch the rotation direction of the motor 21. The rotation direction selector 39 is a mechanical or electrical switch capable of switching the motor 21 to any one of three states, namely, a forward rotation state, a reverse rotation state, and a rotation stop state. The hand grip 15 includes a trigger 40 that is urged to project toward the front of the hand grip 15 by, for example, a spring.

As shown in FIG. 1, a battery pack adapter 16 is formed continuously with the lower end of the hand grip 15 extending toward the front. The battery pack 12 is attached to the battery pack adapter 16.

An upper limit rotation speed selector 41 and a display unit 42 are arranged in the upper surface 16a of the battery pack adapter 16.

Figure 4:
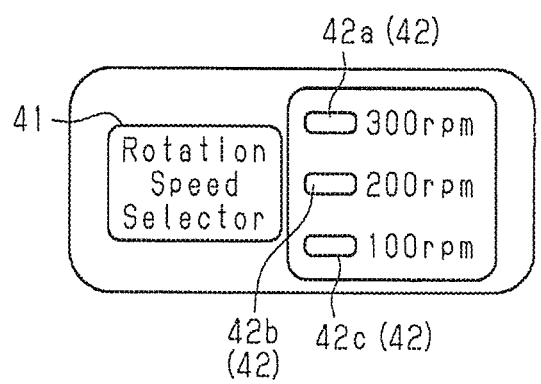
FIG. 4 is a plan view of a upper limit speed selector and a display unit.

The upper limit rotation speed selector 41 allows the user to select or limit the upper limit rotation speed of the output shaft 38 (bit) that corresponds to the upper limit pulled amount of the trigger 40. As shown in FIG. 4, the upper limit rotation speed selector 41 may include an operation unit on which characters such as "Switch Rotation Speed" are printed. The operation unit of the upper limit rotation speed selector 41 is manually manipulated by the user and may be a push button, a toggle switch, a touch sensor, a touch panel, or any other manipulatable switch.

Referring to FIG. 4, the display unit 42 notifies the user of the upper limit rotation speed of the output shaft 38 (bit) that has been selected by the upper limit rotation speed selector 41. The display unit 42 may be configured by, for example, light emitting diodes (LEDs) 42a to 42c. The one of the LEDs 42a to 42c selected by the upper limit rotation speed selector 41 is illuminated.

Referring to FIG. 1, the battery pack adapter 16 accommodates a controller 50 (refer to FIG. 5) that controls the electric power tool 10 including the motor 21.

The electric configuration of the electric power tool 10 will now be described.

Figure 5:
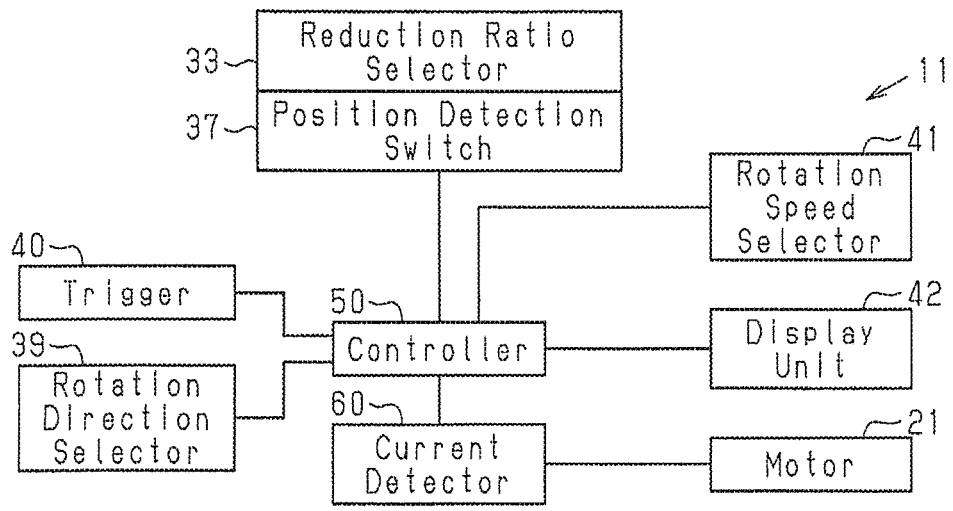
FIG. 5 is a block diagram of the electric power tool.

Referring to FIG. 5, the controller 50, which executes output control on the main body 11, is supplied with power from the battery pack 12 (not shown in FIG. 5). Signals from the reduction ratio selector 33 (manipulation position detection switch 37), the rotation direction selector 39, and the trigger 40 are input to the controller 50.

The controller 50 can determine whether the reduction ratio selector 33 has been switched to the high gear reduction ratio mode or the low gear reduction ratio mode from the position signal of the manipulation position detection switch 37. Further, the controller 50 switches the rotation direction of the motor 21 or stops the rotation of the motor 21 based on the selection of forward rotation, reverse rotation, and stop rotation with the rotation direction selector 39.

The trigger 40 outputs a trigger signal in accordance with the pulled amount of the trigger 40. The controller 50 executes output control in accordance with the pulled amount.

Figure 6:
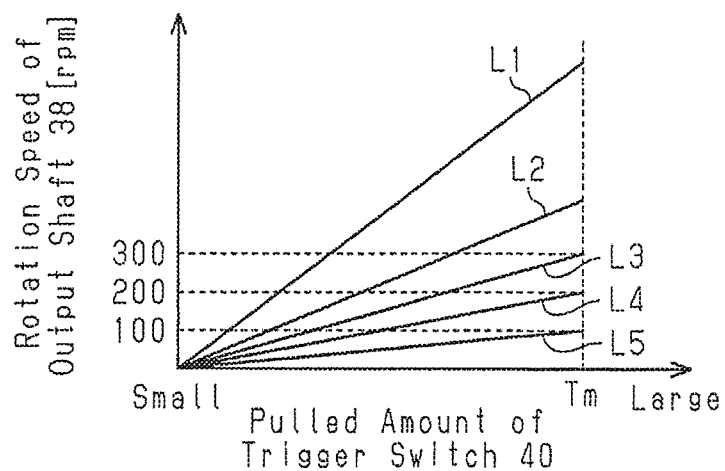
FIG. 6 is a graph illustrating the rotation speed of an output shaft that corresponds to the pulled amount of a trigger.

In the example shown in FIG. 6, the controller 50 controls the motor 21 so that the rotation speed of the output shaft 38 increases as the pulled amount of the trigger 40 increases (refer to FIG. 5). In FIG. 6, the horizontal axis represents the pulled amount of the trigger 40. Further, line L1 represents the high gear mode (high-speed, low-torque mode), and line L2 represents the low gear mode (low-speed, high-torque mode). As shown in FIG. 6, the rotation speed of line L1 (high gear mode) that corresponds to the maximum pulled amount Tm of the trigger 40 is higher than that of line L2 (low gear mode). When the pulled amount of the trigger 40 is the same, the high gear mode (line L1) constantly rotates the output shaft 38 at a higher rotation speed than the low gear mode (line L2).

As shown in FIG. 5, the controller 50 is connected to the upper limit rotation speed selector 41 and the display unit 42. The controller 50 receives a selector signal corresponding to the selected upper limit rotation speed of the output shaft 38 from the upper limit rotation speed selector 41.

In the present embodiment, regardless of whether the reduction ratio selector 33 is in the high gear or the low gear, whenever the upper limit rotation speed selector 41 is operated, the upper limit rotation speed of the output shaft 38 is switched from 300 rotations per minute (rpm) to 200 rpm, 100 rpm, and then no rotation speed limit. When a non-limited rotation speed mode is selected, as shown by lines L1 and L2 in FIG. 6, the rotation speed of the output shaft 38 differs between different reduction ratio modes (high gear, low gear) even when the pulled amount of the trigger 40 is the same.

The upper limit rotation speed selector 41 may be referred to as a motor upper limit rotation speed selector or a motor drive mode selector. The controller 50 includes one or more hardware processors that function as a rotation speed changing circuitry that changes the upper limit rotation speed in accordance with the selection of the upper limit rotation speed selector 41 and a rotation speed control circuitry that controls a rotation speed of the motor 21 in correspondence with a pulled amount of the trigger 40 to obtain the rotation speed of the output shaft that is changed by the rotation speed changing circuitry. Each of lines L3 to L5 corresponds to a limited rotation speed mode.

For example, when the user selects 300 rpm with the upper limit rotation speed selector 41, the controller 50 controls the motor 21 (e.g., drive current) so that the rotation speed of the output shaft 38 corresponding to the maximum pulled amount Tm of the trigger 40 is approximately 300 rpm, as shown by line L3 in FIG. 6. When the pulled amount of the trigger 40 is the same, the controller 50 rotates the output shaft 38 at a lower rotation speed in a first limited rotation speed mode shown by line L3 than in the non-limited rotation speed mode shown by lines L1 and L2.

When the user selects 200 rpm with the upper limit rotation speed selector 41, the controller 50 controls the motor 21 (e.g., drive current) so that the rotation speed of the output shaft 38 corresponding to the maximum pulled amount Tm of the trigger 40 is approximately 200 rpm, as shown by line L4 in FIG. 6. When the pulled amount of the trigger 40 is the same, the controller 50 rotates the output shaft 38 at a lower rotation speed in a second limited rotation speed mode shown by line L4 than in the non-limited rotation speed mode shown by lines L1 and L2 and the first limited rotation speed mode shown by line L3.

When the user selects 100 rpm with the upper limit rotation speed selector 41, the controller 50 controls the motor 21 (e.g., drive current) so that the rotation speed of the output shaft 38 corresponding to the maximum pulled amount Tm of the trigger 40 is approximately 100 rpm, as shown by line L5 in FIG. 6. When the pulled amount of the trigger 40 is the same, the controller 50 rotates the output shaft 38 at a lower rotation speed in a third limited rotation speed mode shown by line L5 than in the non-limited rotation speed mode shown by lines L1 and L2 and the first and second limited rotation speed modes shown by line L3 and L4.

As shown by FIG. 5, the controller 50 is connected to the motor 21 by a current detector 60, which is included in a load detection unit. The current detector 60 detects the drive current supplied to the motor 21. The controller 50 receives a sensor signal corresponding to the drive current detected by the current detector 60. The controller 50 detects the load torque applied to the output shaft 38 from the sensor signal. The controller 50 executes feedback control so that the rotation speed of the output shaft 38 corresponding to the maximum pulled amount of the trigger 40 conforms to the rotation speed selected with the upper limit rotation speed selector 41.

One example of the operation of the electric power tool 1 in the present embodiment will now be described.

When the trigger 40 is pulled, the controller 50 drives the motor 21. The drive force transmission 23 rotates the output shaft 38, and the bit rotates integrally with the output shaft 38. In this manner, the electric power tool 10, for example, bores a hole.

The user manipulates the upper limit rotation speed selector 41 so that the controller 50 controls the motor 21 to limit the rotation speed of the output shaft 38 to one of 100 rpm, 200 rpm, and 300 rpm.

The present embodiment has the advantages described below.

(1) The controller 50 decreases the rotation speed of the output shaft 38 that corresponds to the maximum pulled amount of the trigger 40 from the maximum rotation speed of the non-limited rotation speed mode and accordingly controls the rotation speed of the motor 21 in correspondence with the pulled amount of the trigger 40 so that the output shaft 38. In this manner, the change in the rotation speed of the output shaft 38 corresponding to the maximum pulled amount of the trigger 40 allows the rotation speed of the output shaft 38 to be limited to, for example, a low rotation speed (low speed) such as 100 rpm, 200 rpm, or 300 rpm. This impedes wear of a bit, such as a hole saw, that is attached to the chuck 25 and prolongs the service life of the bit. Further, the output shaft 38 can be rotated at a relatively low and constant rotation speed such as 100 rpm, 200 rpm, or 300 rpm.

(2) The upper limit rotation speed selector 41 provides the controller 50 with a selector signal that switches the rotation speed of the output shaft 38 corresponding to the maximum pulled amount of the trigger 40 in steps when manipulated by the user. Thus, the user can easily decrease the rotation speed of the output shaft 38 by manipulating the upper limit rotation speed selector 41.

(3) The battery pack adapter 16 is an extended portion that extends toward the front from the lower end of the hand grip 15. The upper limit rotation speed selector 41 is located on the battery pack adapter 16. This facilitates the manipulation of the upper limit rotation speed selector 41.

(4) The drive force transmission 23 includes a plurality of (e.g., two) reduction ratios that may be mechanically switched. The controller 50 is configured to be able to change the rotation speed of the output shaft regardless of which one of the reduction ratios (high gear, low gear) the drive force transmission 23 is switched to. For example, the output shaft 38 may be maintained at a low rotation speed regardless of the selected one of the two reduction ratios (high gear, low gear).

(5) The current detector 60 detects the drive current of the motor 21. The controller 50 detects or estimates the load (load torque) acting on the output shaft 38 from the detected drive current. Then, the controller 50 executes feedback control so that the rotation speed of the output shaft 38 conforms to the rotation speed selected by the upper limit rotation speed selector 41. This controls the motor 21 so as to substantially obtain the rotation speed of the output shaft 38 selected with the upper limit rotation speed selector 41 even when the load applied to the output shaft 38 from the outside changes.

(6) In the illustrated example, the rotation speed of the output shaft 38 may be mechanically changed without manipulating the upper limit rotation speed selector 41 or changing the pulled amount of the trigger 40 as long as the reduction ratio (high gear, low gear) is changed. Further, the rotation speed of the output shaft 38 may be non-mechanically, or electrically, changed without changing the reduction ratio (high gear, low gear) or the pulled amount of the trigger 40 as long as the upper limit rotation speed selector 41 is manipulated to switch from the non-limited rotation speed mode (e.g., line L1) to a limited rotation speed mode (e.g., line L3).

For example, the user may manipulate the upper limit rotation speed selector 41 to switch from the non-limited rotation speed mode corresponding to line L1 (high gear) in FIG. 6 to the first limited rotation speed mode corresponding to line L3 in FIG. 6 while the high gear remains selected by the reduction ratio selector 33. Here, the reduction ratio is not changed, and the high gear is maintained. In this case, the controller 50 limits the rotation speed of the motor by decreasing the drive current of the motor 21 by a first change ratio so that the output shaft 38 is rotated at the speed shown by line L3.

In the same manner, the user may manipulate the upper limit rotation speed selector 41 to switch from the non-limited rotation speed mode corresponding to line L2 (low gear) in FIG. 6 to the first limited rotation speed mode corresponding to line L3 in FIG. 6 while the low gear remains selected by the reduction ratio selector 33. Here, the reduction ratio is not changed, and the low gear is maintained. In this case, the controller 50 limits the rotation speed of the motor by decreasing the drive current of the motor 21 by a second change ratio, which differs from the first change ratio, so that the output shaft 38 is rotated at the speed shown by line L3.

It should be apparent to those skilled in the art that the present invention may be embodied in many other specific forms without departing from the spirit or scope of the invention. Particularly, it should be understood that the present invention may be embodied in the following forms.

In the above embodiment, the upper limit rotation speed selector 41 is located on the battery pack adapter 16. However, the location of the upper limit rotation speed selector 41 may be changed.

In the above embodiment, the power supply of the electric power tool 10 is the battery pack 12. However, the power supply may be a commercial power supply.

In the above embodiment, the reduction ratio selector 33 allows for switching between two steps, namely, the high-speed, low torque mode (high gear mode) and the low-speed, high-torque mode (low gear mode). Instead, the electric power tool 10 may be configured to allow for switching to three or more reduction ratios. Further, the selection of a number of reduction ratios may be disabled. Moreover, the reduction ratio may be automatically changed in accordance with changes in the load torque acting on the output shaft 38.

In the above embodiment, the load on the output shaft 38 is detected (estimated) from the drive current of the motor 21. Instead, the load (load torque) on the output shaft 38 may be directly detected.

It is preferred that the rotation speed of the limited rotation speed modes be set to 100 rpm, 200 rpm, and 300 rpm. However, other predetermined rotation speeds may be set.

The controller 50 may include a rotation speed map such as that shown in FIG. 6.

For each of the non-limited rotation speed modes and the limited rotation speed modes, the controller 50 may have specific numeric values for the rotation speed of the output shaft 38 corresponding to the maximum pulled amount Tm of the trigger 40 (maximum rotation speed, upper limit rotation speed). For example, when the first limited rotation speed mode is selected, the controller 50 may limit the drive current of the motor 21 in accordance with the ratio of the specified numerical value of the first limited rotation speed mode and the specified numerical value of a non-limited rotation speed mode.

The present disclosure includes the following embodiments.

(Clause 1) An electric power tool including: a motor; an output shaft; a drive force transmission configured to reduce drive speed of the motor and transmit drive force of the motor to the output shaft; a trigger that can be pulled by a user; a rotation speed changing circuitry configured to change a rotation speed of the output shaft that corresponds to a maximum pulled amount of the trigger to a limited rotation speed that is lower than a maximum rotation speed of the output shaft in a non-limited rotation speed mode; and a rotation speed control circuitry configured to control a rotation speed of the motor in correspondence with a pulled amount of the trigger to obtain the rotation speed of the output shaft that is changed by the rotation speed changing circuitry.

(Clause 2) The electric power tool according to clause 1, further including an upper limit rotation speed selector that provides the rotation speed changing circuitry with a selector signal for switching, in steps, the rotation speed of the output shaft corresponding to the maximum pulled amount of the trigger.

(Clause 3) The electric power tool according to clause 2, further including a hand grip and an extended portion that forwardly extends from a lower end of the hand grip, wherein the upper limit rotation speed selector is located on the extended portion.

(Clause 4) The electric power tool according to any one of clauses 1 to 3, wherein the drive force transmission includes a plurality of reduction ratios that are mechanically switchable, and the rotation speed changing circuitry is configured to be able to change the rotation speed of the output shaft regardless of the one of the reduction ratios to which the drive force transmission is switched.

(Clause 5) The electric power tool according to any one of clauses 1 to 4, further including a load detector that detects a parameter that changes in accordance with a load applied to the output shaft from outside the electric power tool, wherein the rotation speed control circuitry executes feedback control in accordance with the load detected by the load detector and rotates the rotation shaft at the rotation speed changed by the rotation speed changing circuitry.

(Clause 6) An electric power tool including: a motor; an output shaft; a drive force transmission that transmits rotation of the motor to the output shaft, wherein the drive force transmission includes a plurality of reduction ratios that are mechanically selected by a reduction ratio selector; a trigger; a controller that controls the motor in correspondence with a pulled amount of the trigger; and an upper limit rotation speed selector that switches the controller to one selected from a group of a non-limited rotation speed mode, a first limited rotation speed mode, and a second limited rotation speed mode; wherein in the non-limited rotation speed mode, a maximum rotation speed of the output shaft corresponding to a maximum pulled amount of the trigger is a predetermined rotation speed that is dependent on the reduction ratio selected by the reduction ratio selector; in the first upper limit rotation speed mode, the controller electrically controls the motor so that the maximum rotation speed of the output shaft corresponding to the maximum pulled amount of the trigger is limited to a first upper limit rotation speed that is lower than the predetermined rotation speed; in the first upper limit rotation speed mode, the controller electrically controls the motor so that the output shaft rotates at a rotation speed that corresponds to the pulled amount of the trigger and does not exceed the first upper limit rotation speed of the output shaft; in the second upper limit rotation speed mode, the controller electrically controls the motor so that the maximum rotation speed of the output shaft corresponding to the maximum pulled amount of the trigger is limited to a second upper limit rotation speed that is lower than the first upper limit rotation speed; in the second upper limit rotation speed mode, the controller electrically controls the motor so that the output shaft rotates at a rotation speed corresponding to the pulled amount of the trigger and does not exceed the second upper limit rotation speed of the output shaft.

(Clause 7) The electric power tool according to clause 6, wherein the controller electrically controls the motor so that the output shaft rotates at the first upper limit rotation speed regardless of the reduction ratio selected by the reduction ratio selector when the controller is in the first upper limit rotation speed mode and the pulled amount of the trigger is maximum.

It should be apparent to those skilled in the art that the present invention may be embodied in many other specific forms without departing from the scope of the invention. For example, some of the components may be omitted from the components described in the embodiments (or one or more aspects thereof). Further, components in different embodiments may be appropriately combined. The scope of the present invention and equivalence of the present invention are to be understood with reference to the appended claims.

The invention claimed is:

1. A drill driver comprising:
    a main body case that includes a cylindrical body portion and a hand grip, wherein the hand grip extends downward from the body portion, and a battery pack adapter is formed continuously with a lower end of the hand grip extending toward a front of the hand grip;
    a motor that is accommodated in the body portion;
    an output shaft;
    a drive force transmission configured to reduce drive speed of the motor and transmit drive force of the motor to the output shaft;
    a trigger that can be pulled by a user, wherein a drill mode for executing a drilling function of the drill driver includes a limited rotation speed mode in which a maximum rotation speed of the output shaft corresponding to a maximum retraction of the trigger is selectively limited to one of a plurality of upper limit rotation speeds, and a non-limited rotation speed mode in which the maximum rotation speed of the output shaft corresponding to the maximum retraction of the trigger is not limited; and
    an operation unit that is configured to be operated by a user to switch the drill mode between the limited rotation speed mode and the non-limited rotation speed mode, wherein the operation unit is further configured to be operated by the user to select one of the upper limit rotation speeds in the limited rotation speed mode;
    wherein the drill driver further comprises a display unit that is arranged in an upper surface of the battery pack adapter,
    wherein the display unit includes a plurality of indicators respectively corresponding to the upper limit rotation speeds,
    wherein the display unit does not include an indicator corresponding to the non-limited rotation speed mode,
    wherein the display unit illuminates a portion corresponding to the upper limit rotation speed selected by an operation of the operation unit in the limited rotation speed mode,
    wherein the drive force transmission includes a plurality of reduction ratios, and
    wherein the main body case includes a reduction ratio selector that is configured to be manually manipulated by the user to select one of the reduction ratios of the drive force transmission.

2. The drill driver according to claim 1, wherein the reduction ratio selector is arranged in an upper surface of the main body case.

\* \* \* \* \*